(12) United States Patent
Hamilton et al.

(10) Patent No.: US 12,169,512 B2
(45) Date of Patent: Dec. 17, 2024

(54) SEARCH ANALYSIS AND RETRIEVAL VIA MACHINE LEARNING EMBEDDINGS

(71) Applicant: UnitedHealth Group Incorporated, Minnetonka, MN (US)

(72) Inventors: Laura D. Hamilton, Chicago, IL (US); Vinit Garg, Fremont, CA (US); Ayush Tomar, Morgan Hill, CA (US); Martin R. Linenweber, San Francisco, CA (US); Preet Kamal S. Bawa, Vernon Hills, IL (US); David Armbrust, Glen Ellyn, IL (US); Rupesh Kartha, San Ramon, CA (US); Lun Yu, San Francisco, CA (US)

(73) Assignee: UnitedHealth Group Incorporated, Minnetonka, MN (US)

( * ) Notice: Subject to any disclaimer, the term of this patent is extended or adjusted under 35 U.S.C. 154(b) by 0 days.

(21) Appl. No.: 17/971,491

(22) Filed: Oct. 21, 2022

(65) Prior Publication Data

US 2023/0409614 A1    Dec. 21, 2023

Related U.S. Application Data

(60) Provisional application No. 63/366,425, filed on Jun. 15, 2022.

(51) Int. Cl.
*G06F 16/33* (2019.01)
*G06F 16/332* (2019.01)
*G06F 16/387* (2019.01)

(52) U.S. Cl.
CPC ...... *G06F 16/3325* (2019.01); *G06F 16/3334* (2019.01); *G06F 16/387* (2019.01)

(58) Field of Classification Search
CPC . G06F 16/3325; G06F 16/3334; G06F 16/387
See application file for complete search history.

(56) References Cited

U.S. PATENT DOCUMENTS

| | | |
|---|---|---|
| 6,182,068 B1 | 1/2001 | Culliss |
| 6,564,213 B1 | 5/2003 | Ortega et al. |

(Continued)

FOREIGN PATENT DOCUMENTS

| | | |
|---|---|---|
| CA | 2816517 A1 | 4/2012 |
| CA | 2836381 A1 | 11/2012 |

(Continued)

OTHER PUBLICATIONS

Ahmad, Wasi Uddin et al. "Context Attentive Document Ranking and Query Suggestion," In Proceedings of the 42nd International ACM SIGIR Conference on Research and Development in Information Retrieval, Jul. 21-25, 2019, pp. 385-394, DOI: 10.1145/3331184.3331246.

(Continued)

*Primary Examiner* — Grace Park
(74) *Attorney, Agent, or Firm* — ALSTON & BIRD LLP

(57) ABSTRACT

Various embodiments of the present disclosure provide methods, apparatus, systems, computing devices, computing entities, and/or the like for retrieving relevant items for user queries by generating, using a search engine machine learning model, a prediction-based action for the query input wherein query input embeddings of the query input are generated. For each query input embedding, a k-Nearest-Neighbor (KNN) search is performed with respect to search engine repository item embeddings to generate initial search results, and for each initial set result, performing N hops within a semantic graph starting from nodes associated with the initial search result to generate related search results. The search engine machine learning model is trained by generating a search engine repository item embeddings according to embedding techniques for respective content categories and generating the semantic graph based at least in part on (Continued)

a measure of similarity for pairs of search engine repository item embeddings.

20 Claims, 11 Drawing Sheets

(56) References Cited

U.S. PATENT DOCUMENTS

| | | | |
|---|---|---|---|
| 7,657,522 B1 | 2/2010 | Puzicha et al. | |
| 7,933,859 B1 | 4/2011 | Puzicha et al. | |
| 8,100,829 B2 | 1/2012 | Rothman et al. | |
| 8,312,138 B2 | 11/2012 | Hull et al. | |
| 8,392,207 B2 | 3/2013 | Olaniyan | |
| 8,403,847 B2 | 3/2013 | Rothman et al. | |
| 8,583,450 B2 | 11/2013 | Baker et al. | |
| 8,620,842 B1 | 12/2013 | Cormack | |
| 8,706,530 B2 | 4/2014 | Ohnemus et al. | |
| 8,972,397 B2 | 3/2015 | Imig et al. | |
| 8,996,314 B2 | 3/2015 | Ohnemus et al. | |
| 9,058,327 B1 | 6/2015 | Lehrman et al. | |
| 9,424,532 B1 | 8/2016 | Abedini et al. | |
| 9,436,760 B1 * | 9/2016 | Tacchi | G06F 16/9024 |
| 10,026,114 B2 | 7/2018 | Tolvanen et al. | |
| 10,062,039 B1 | 8/2018 | Lockett | |
| 10,176,541 B2 | 1/2019 | Chaudhri et al. | |
| 10,262,384 B1 | 4/2019 | Albro et al. | |
| 10,409,874 B2 | 9/2019 | Cheng | |
| 10,413,779 B2 | 9/2019 | Ingram et al. | |
| 10,438,291 B1 | 10/2019 | Neben et al. | |
| 10,943,072 B1 | 3/2021 | Jaganmohan | |
| 10,943,178 B1 | 3/2021 | Gao et al. | |
| 11,004,135 B1 | 5/2021 | Sandler et al. | |
| 11,238,113 B2 | 2/2022 | Freese et al. | |
| 11,276,089 B1 | 3/2022 | Salehie et al. | |
| 11,775,989 B1 | 10/2023 | Hao et al. | |
| 12,080,398 B2 | 9/2024 | Nida et al. | |
| 2002/0103680 A1 | 8/2002 | Newman | |
| 2003/0163349 A1 | 8/2003 | Ho | |
| 2005/0060194 A1 | 3/2005 | Brown | |
| 2005/0075931 A1 | 4/2005 | Pearson | |
| 2005/0165627 A1 | 7/2005 | Fotsch et al. | |
| 2008/0133272 A1 | 6/2008 | Marshall | |
| 2009/0254402 A1 | 10/2009 | Beall | |
| 2010/0063846 A1 | 3/2010 | Shakamuri | |
| 2010/0076786 A1 | 3/2010 | Dalton et al. | |
| 2010/0179839 A1 | 7/2010 | Collins et al. | |
| 2011/0077973 A1 | 3/2011 | Breitenstein et al. | |
| 2011/0161110 A1 | 6/2011 | Mault | |
| 2012/0089413 A1 | 4/2012 | Balassanian | |
| 2012/0296455 A1 | 11/2012 | Ohnemus et al. | |
| 2013/0073676 A1 | 3/2013 | Sandholm | |
| 2013/0211858 A1 | 8/2013 | Ohnemus et al. | |
| 2014/0067423 A1 | 3/2014 | Joao | |
| 2014/0088986 A1 | 3/2014 | Gowdy et al. | |
| 2014/0100860 A1 | 4/2014 | Stollmeyer et al. | |
| 2014/0129493 A1 | 5/2014 | Leopold | |
| 2014/0156308 A1 | 6/2014 | Ohnemus et al. | |
| 2014/0310013 A1 | 10/2014 | Ram et al. | |
| 2014/0316811 A1 | 10/2014 | Ohnemus et al. | |
| 2014/0372133 A1 | 12/2014 | Austrum et al. | |
| 2015/0331878 A1 | 11/2015 | Joseph et al. | |
| 2016/0048646 A1 | 2/2016 | Stover et al. | |
| 2016/0078101 A1 | 3/2016 | Somaiya et al. | |
| 2016/0092598 A1 | 3/2016 | Mishra | |
| 2016/0110826 A1 | 4/2016 | Morimoto et al. | |
| 2017/0249713 A1 | 8/2017 | Serbinis et al. | |
| 2017/0270115 A1 | 9/2017 | Cormack et al. | |
| 2017/0293923 A1 | 10/2017 | Margolis et al. | |
| 2018/0025334 A1 | 1/2018 | Pourfallah et al. | |
| 2018/0082030 A1 | 3/2018 | Allen et al. | |
| 2018/0165288 A1 | 6/2018 | Chang et al. | |
| 2018/0341875 A1 | 11/2018 | Carr | |
| 2019/0005409 A1 | 1/2019 | Doshi et al. | |
| 2019/0325031 A1 | 10/2019 | Puzicha | |
| 2020/0005149 A1 | 1/2020 | Ramanath et al. | |
| 2020/0073953 A1 | 3/2020 | Kulkarni | |
| 2020/0092695 A1 | 3/2020 | Vigeant et al. | |
| 2020/0279641 A1 | 9/2020 | Nida et al. | |
| 2020/0342010 A1 | 10/2020 | Rosomoff | |
| 2020/0365259 A1 | 11/2020 | Chmait et al. | |
| 2021/0090694 A1 | 3/2021 | Colley et al. | |
| 2021/0174164 A1 | 6/2021 | Hsieh et al. | |
| 2021/0319520 A1 | 10/2021 | Winters | |
| 2022/0035869 A1 | 2/2022 | Beck et al. | |
| 2022/0198573 A1 | 6/2022 | Brown et al. | |
| 2023/0138014 A1 * | 5/2023 | Björkqvist | G06F 16/322 707/706 |
| 2023/0169139 A1 | 6/2023 | Baek et al. | |
| 2023/0170092 A1 | 6/2023 | Moon et al. | |
| 2023/0283987 A1 | 9/2023 | Cheng et al. | |
| 2024/0054326 A1 * | 2/2024 | Dave | G06N 3/08 |
| 2024/0248901 A1 | 7/2024 | Krishnan et al. | |

FOREIGN PATENT DOCUMENTS

| | | | | |
|---|---|---|---|---|
| CA | 2841006 A1 | 1/2013 | | |
| CN | 103329135 A | 9/2013 | | |
| CN | 107665217 A | 2/2018 | | |
| CN | 108304439 B * | 7/2021 | | G06F 16/36 |
| EP | 2622568 A1 | 8/2013 | | |
| EP | 2710503 A1 | 3/2014 | | |
| EP | 2729912 A1 | 5/2014 | | |
| WO | 2012/050969 A1 | 4/2012 | | |
| WO | 2012/156374 A1 | 11/2012 | | |
| WO | 2013/004706 A1 | 1/2013 | | |
| WO | 2014/087252 A2 | 6/2014 | | |

OTHER PUBLICATIONS

Dao, Tien Tuan et al. "Knowledge-Based Personalized Search Engine for the Web-Based Human Musculoskeletal System Resources (HMSR) In Biomechanics," Journal of Biomedical Informatics, vol. 46, pp. 160-173, Feb. 1, 2013, (ePub: Nov. 10, 2012), DOI: 10.1016/j.jbi.2012.11.001.

Galli, Keith. Galli K. "High-Performance Intent Classification in Sparse Supervised Data Conditions," Doctoral Dissertation, Massachusetts Institute of Technology, Jun. 2019, (62 pages), available online: https://dspace.mit.edu/bitstream/handle/1721.1/123200/1128822757-MIT.pdf?sequence=1&isAllowed=y.

Gupta, Jai et al. "Personalized Online Spell Correction for Personal Search," In Proceedings of the 2019 World Wide Web Conference (WWW'19), May 13-17, 2019, (7 pages), DOI: 10.1145/3308558.3313706.

Hwang, Sewoong et al. "Toward a Chatbot for Financial Sustainability," Sustainability, vol. 13, No. 6:3173, Mar. 13, 2021, pp. 1-18, DOI: 10.3390/su13063173.

McCreadie, Richard et al. "A Study of Personalised Medical Literature Search," In International Conference of the Cross-Language Evaluation Forum for European Languages, Sep. 15, 2014, pp. 74-85, Springer, Cham, DOI: 10.1007/978-3-319-11382-1_8.

Yadav, Nishant et al. "Session Aware Query Auto Completion Using Extreme Multi-Label Ranking," arXiv Preprint arXiv:2012.07654v2 [cs.IR], Jun. 7, 2021, (10 pages), available online: https://assets.amazon.science/5e/76/6ebacfc240e1a58b69a6f5347833/session-aware-query-auto-completion-using- extreme-multi-label-ranking.pdf.

International Search Report and Written Opinion for International Application No. PCT/US2023/015396, dated Jun. 19, 2023, (13 pages), European Patent Office, Rijswijk, Netherlands.

"Clinical Management Guidelines for Obstetrician-Gynecologists", The American College of Obstetricians and Gynecologists Practice Bulletin, No. 109, Dec. 2009, pp. 1-12.

Chapelle, Olivier et al. "A Dynamic Bayesian Network Click Model for Web Search Ranking," In Proceedings of the 18th International Conference on World Wide Web, Apr. 20, 2009, pp. 1-10, Madrid, Spain, available online at https://citeseerx.ist.psu.edu/viewdoc/download?doi=10.1.1.180.337&rep=rep1&type=pdf.

Li, Jianqiang et al. "Diversity-Aware Retrieval of Medical Records," Computers in Industry, vol. 29, pp. 81-91, May 2015, DOI: http://dx.doi.org/10.1016/j.compind.2014.09.004.

(56) References Cited

OTHER PUBLICATIONS

Miller, Alissa S. et al. "Improving Stage of Change in an Employee Wellness Program," Workplace Health & Safety, vol. 67, No. 8, pp. 381-290, Aug. 2019, DOI: 10.1177/2165079919838291.

Momma, Michinari et al. "Multi-Objective Relevance Ranking," In Proceedings of the SIGIR 2019 eCom Workshop, Jul. 2019, (8 pages), Paris, France, DOI: https://assets.amazon.science/6f/7f/a34aac77415ead5d4d518d5b1801/multi-objective-relevance-ranking.pdf.

Perrault, Evan K. et al. "Employees' Refusals to Participate in an Employer-Sponsored Wellness Program: Barriers and Benefits to Engagement," Compensation & Benefits Review, vol. 52, No. 1, p. 8-18, Jan. 2020, DOI: 10.1177/0886368719899209.

Sun, Xu et al. "Feature-Frequency-Adaptive On-Line Training for Fast and Accurate Natural Language Processing," Computational Linguistics, vol. 40, No. 3, pp. 563-586, Sep. 1, 2014, DOI: 10.1162/COLL_a_00193.

U.S. Provisional Patent Application, "Automated Health Data Acquisition, Processing and Communication System", Unpublished (filing date Nov. 30, 2012), (Peter Ohnemus, Inventor), 98 pages, U.S.A., U.S. Appl. No. 61/732,203.

U.S. Provisional Patent Application, "Health Data Acquisition, Processing and Communication System", Unpublished (filing date Jun. 9, 2011), (Peter Ohnemus, Inventor), 50 pages, U.S.A., U.S. Appl. No. 61/495,247.

U.S. Provisional Patent Application, "Health Data Acquisition, Processing and Communication System", Unpublished (filing date Sep. 29, 2010), (Peter Ohnemus, Inventor), 31 pages, U.S.A., U.S. Appl. No. 61/387,906.

U.S. Provisional Patent Application, "System and Method for Personal Energy Expenditure Analyses", Unpublished (filing date May 16, 2011), (Peter Ohnemus, Inventor), 35 pages, U.S.A., U.S. Appl. No. 61/486,658.

Wu, Qiang et al. "Adapting Boosting for Information Retrieval Measures," Learning to Rank for Information Retrieval, vol. 13, pp. 254-270, Jun. 2010, DOI: https://citeseerx.ist.psu.edu/viewdoc/download?doi=10.1.1.157.5117&rep=rep1&type=pdf.

Non-Final Rejection Mailed on Mar. 13, 2024 for U.S. Appl. No. 17/934,688, 20 page(s).

Non-Final Rejection Mailed on Jun. 20, 2024 for U.S. Appl. No. 18/314,441, 15 page(s).

"Semantic Textual Similarity," SBERT.net, (2 pages), (2024), [retrieved from the Internet Sep. 13, 2024] <URL: https://www.sbert.net/examples/training/sts/README.html>.

Final Office Action for U.S. Appl. No. 17/934,688, dated Sep. 13, 2024, (20 pages), U.S. Patent and Trademark Office, US.

Non-Final Rejection Mailed on Sep. 20, 2024 for U.S. Appl. No. 18/047,209, 46 page(s).

* cited by examiner

SEARCH ANALYSIS AND RETRIEVAL VIA MACHINE LEARNING EMBEDDINGS

CROSS REFERENCE TO RELATED APPLICATION

This application claims the priority of U.S. Provisional Application No. 63/366,425, entitled "PERSONALIZED PROGRAM SEARCH PROMOTION," filed on Jun. 15, 2022, the disclosure of which is hereby incorporated by reference in its entirety.

BACKGROUND

Various embodiments of the present disclosure address technical challenges related to performing searches on a repository of content items and provide solutions to address the quality of search results generated by existing information retrieval systems.

BRIEF SUMMARY

In general, various embodiments of the present disclosure provide methods, apparatus, systems, computing devices, computing entities, and/or the like for retrieving relevant items for user queries.

In accordance with one aspect, a method is provided. In one embodiment, the method comprises: receiving, by a computing device, a query input; generating, by the computing device and using a search engine machine learning model, a prediction-based action for the query input wherein: for each content category, a query input embedding of the query input is generated with respect to the content category; for each query input embedding, a k-Nearest-Neighbor (KNN) search is performed with respect to search engine repository item embeddings to generate initial search results; for each initial set result, performing N hops within a semantic graph starting from nodes associated with the initial search result to generate related search results; training, by the computing device, the search engine machine learning model, the training comprising: for each search engine repository item of a search engine repository, assigning one or more content category labels and generating a search engine repository item embedding according to embedding techniques for respective content categories associated with the one or more content category labels; and generating the semantic graph based at least in part on a measure of similarity for pairs of search engine repository item embeddings associated with pairs of the search engine repository items.

In accordance with another aspect, an apparatus comprising at least one processor and at least one memory including computer program code is provided. In one embodiment, the at least one memory and the computer program code may be configured to, with the processor, cause the apparatus to: receive a query input; generate, using a search engine machine learning model, a prediction-based action for the query input wherein: for each content category, a query input embedding of the query input is generated with respect to the content category; for each query input embedding, a k-Nearest-Neighbor (KNN) search is performed with respect to search engine repository item embeddings to generate initial search results; for each initial set result, performing N hops within a semantic graph starting from nodes associated with the initial search result to generate related search results; and train the search engine machine learning model, the training comprising: for each search engine repository item of a search engine repository, assigning one or more content category labels and generating a search engine repository item embedding according to embedding techniques for respective content categories associated with the one or more content category labels; and generating the semantic graph based at least in part on a measure of similarity for pairs of search engine repository item embeddings associated with pairs of the search engine repository items.

In accordance with yet another aspect, a computer program product is provided. The computer program product may comprise at least one computer-readable storage medium having computer-readable program code portions stored therein, the computer-readable program code portions comprising executable portions configured to: receive a query input; generate, using a search engine machine learning model, a prediction-based action for the query input wherein: for each content category, a query input embedding of the query input is generated with respect to the content category; for each query input embedding, a k-Nearest-Neighbor (KNN) search is performed with respect to search engine repository item embeddings to generate initial search results; for each initial set result, performing N hops within a semantic graph starting from nodes associated with the initial search result to generate related search results; and train the search engine machine learning model, the training comprising: for each search engine repository item of a search engine repository, assigning one or more content category labels and generating a search engine repository item embedding according to embedding techniques for respective content categories associated with the one or more content category labels; and generating the semantic graph based at least in part on a measure of similarity for pairs of search engine repository item embeddings associated with pairs of the search engine repository items.

BRIEF DESCRIPTION OF THE DRAWINGS

Figure 1:
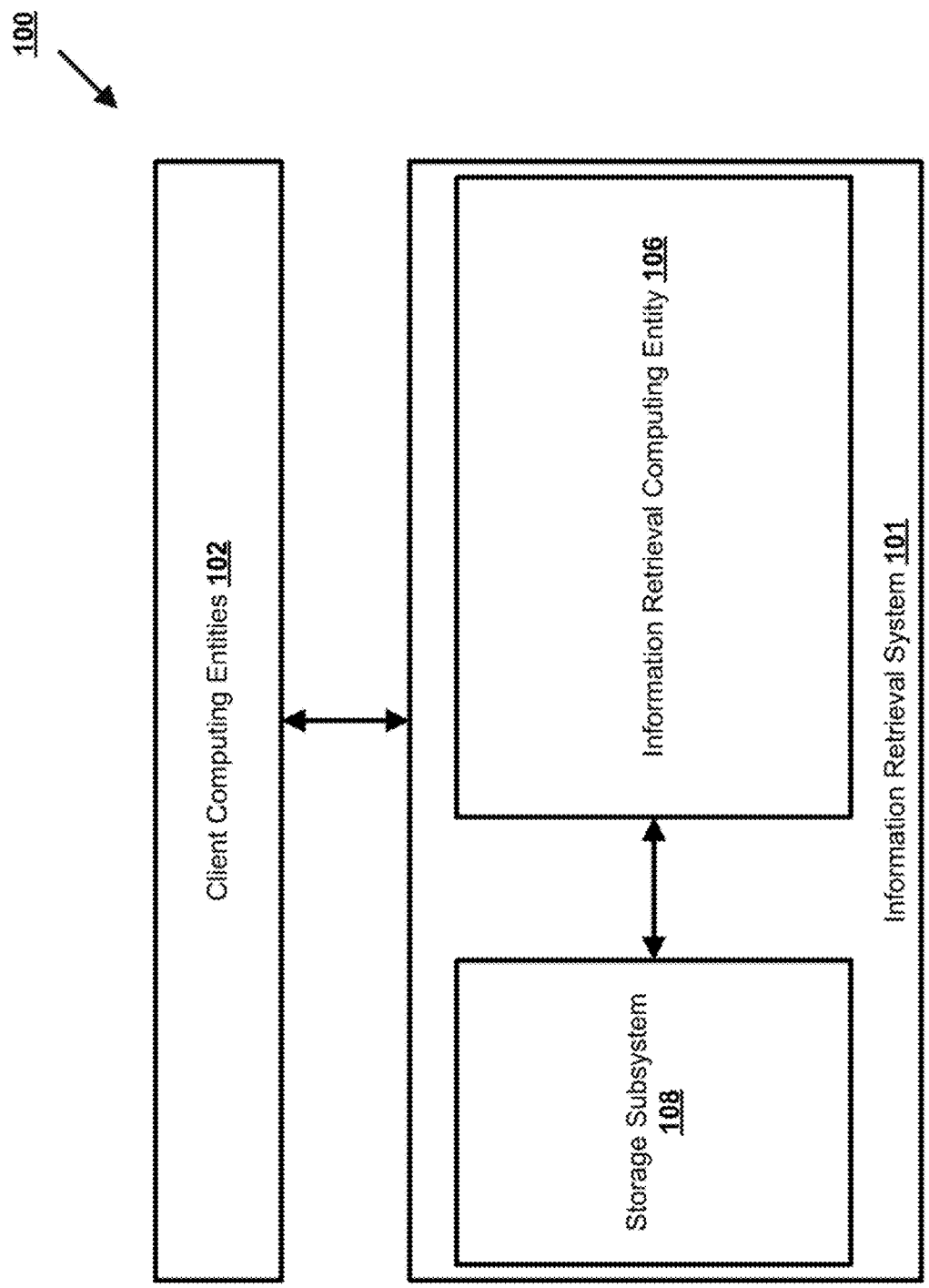

Having thus described the disclosure in general terms, reference will now be made to the accompanying drawings, which are not necessarily drawn to scale, and wherein:

FIG. 1 provides an exemplary overview of an architecture that can be used to practice embodiments of the present disclosure.

Figure 2:
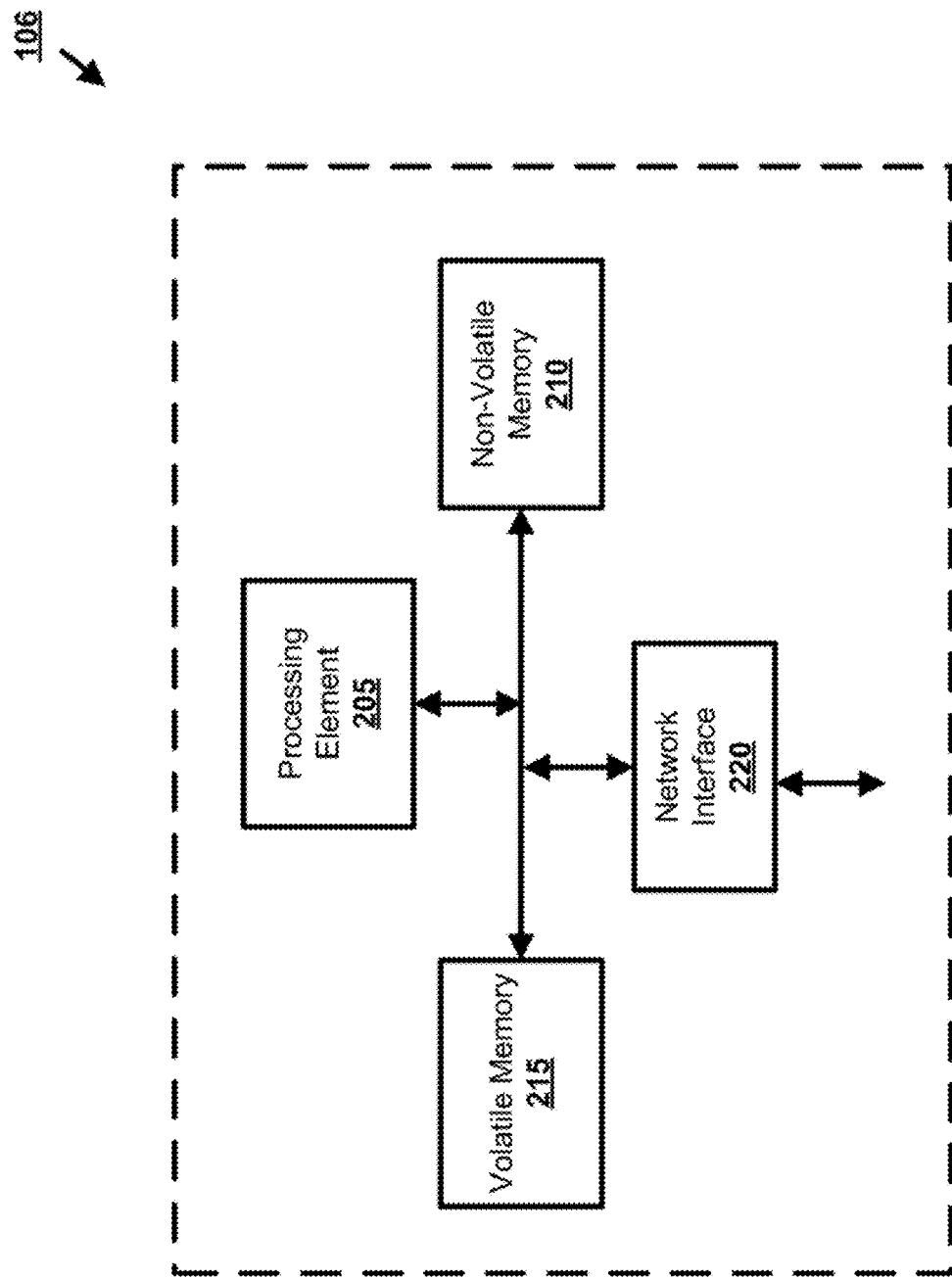

FIG. 2 provides an example information retrieval computing entity in accordance with some embodiments discussed herein.

Figure 3:
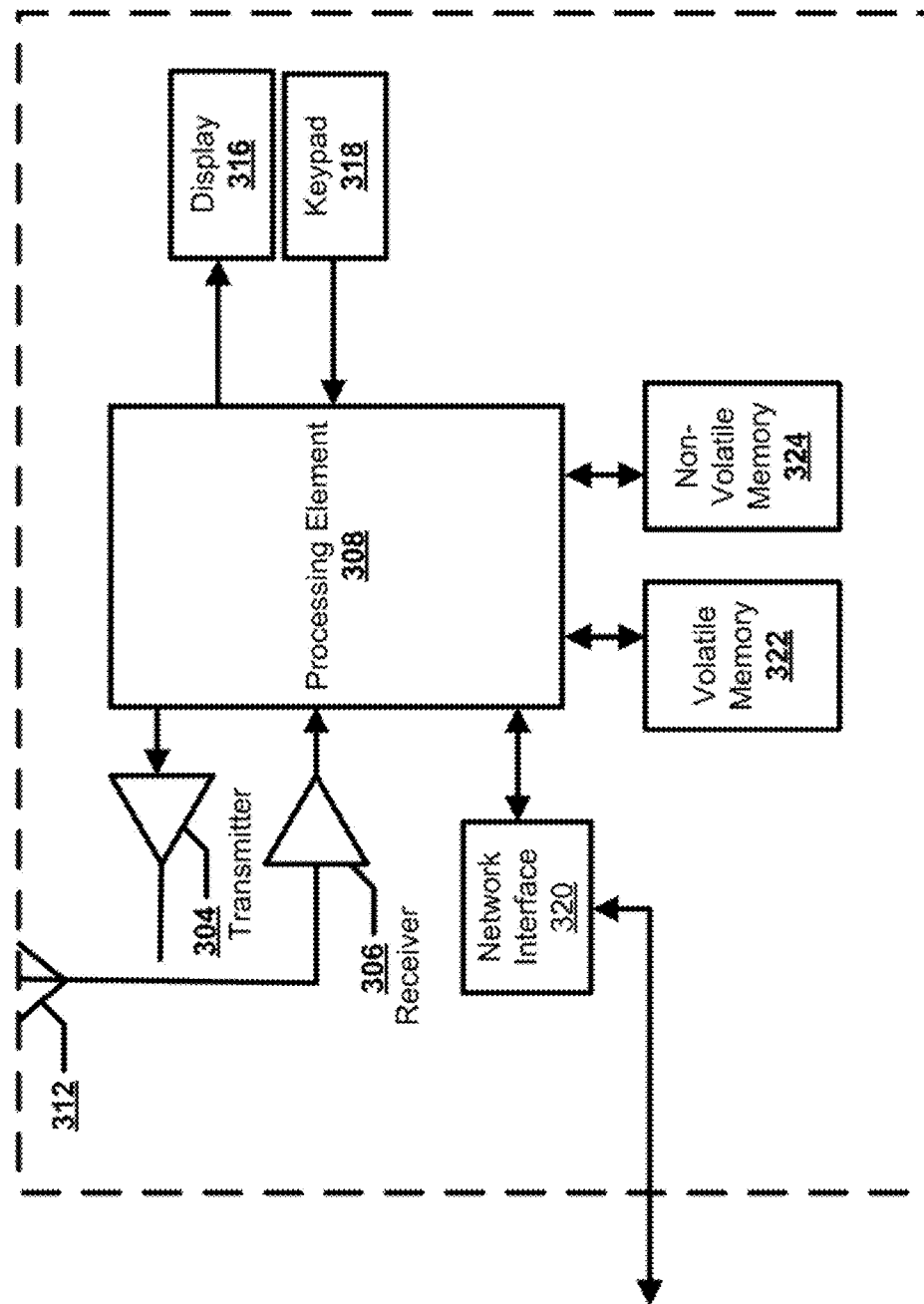

FIG. 3 provides an example client computing entity in accordance with some embodiments discussed herein.

Figure 4:
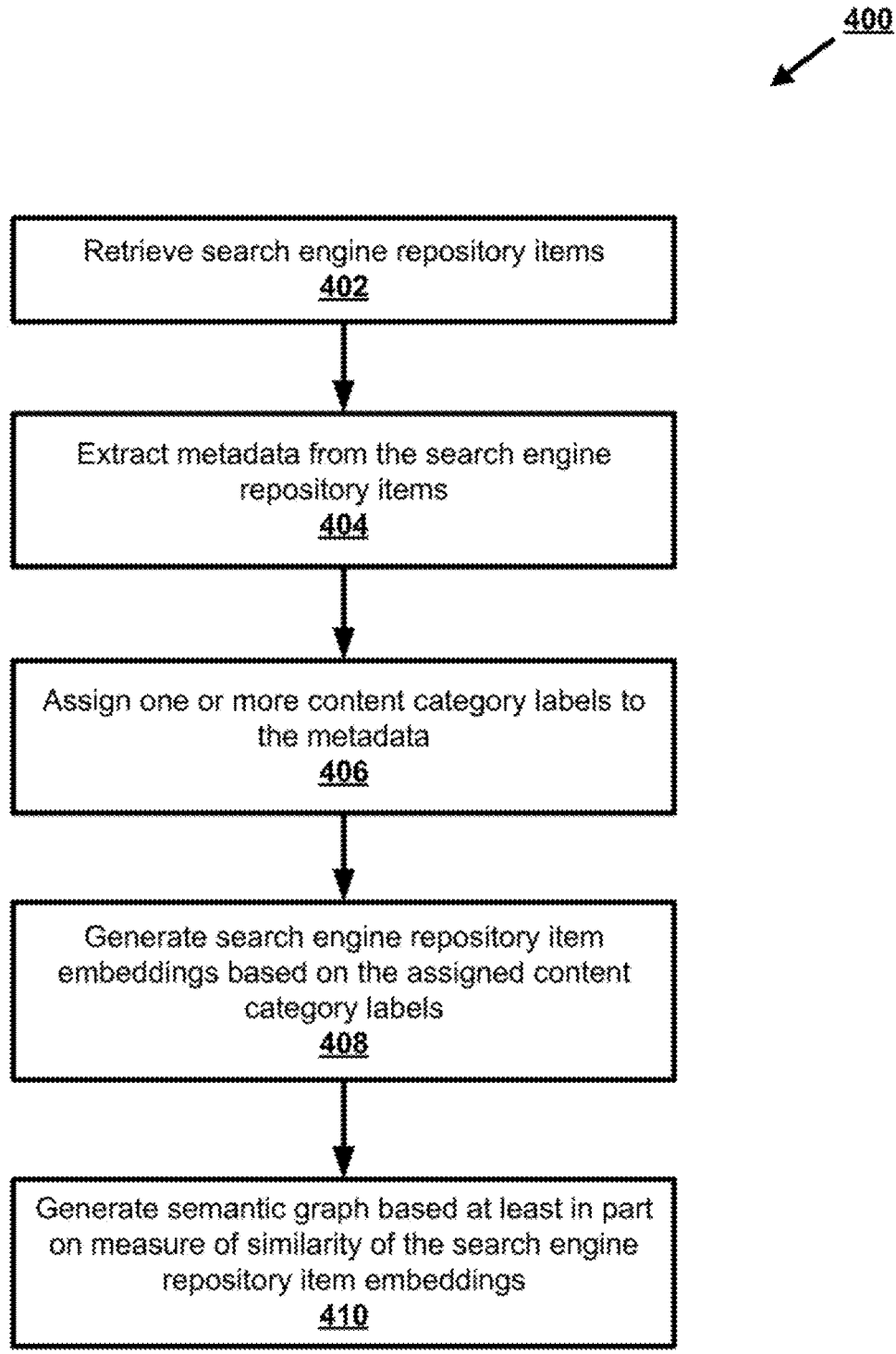

FIG. 4 is a flowchart diagram of an example process for building a search engine in accordance with some embodiments discussed herein.

Figure 5:
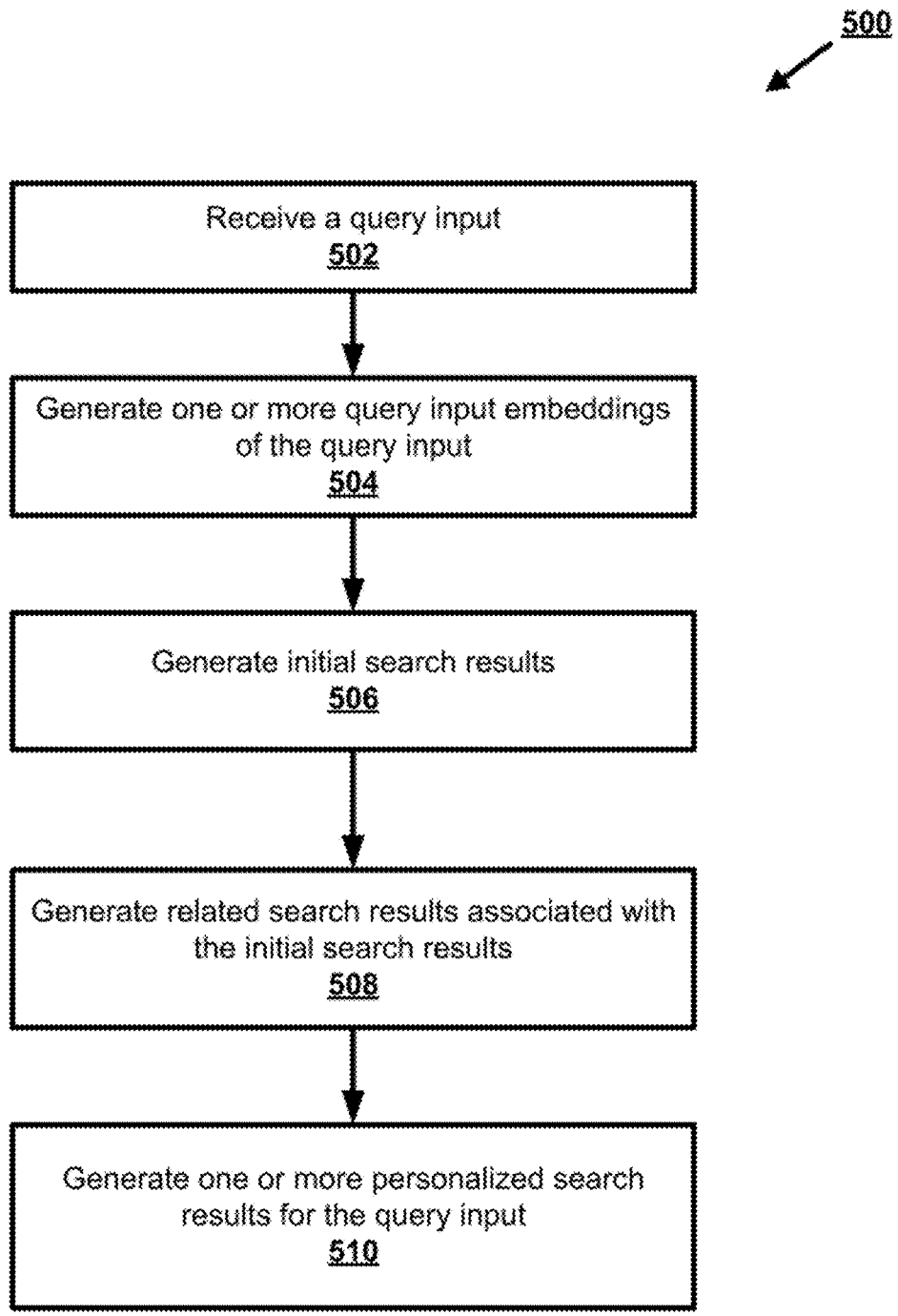

FIG. 5 is a flowchart diagram of an example process for performing search operations on query inputs in accordance with some embodiments discussed herein.

Figure 6:
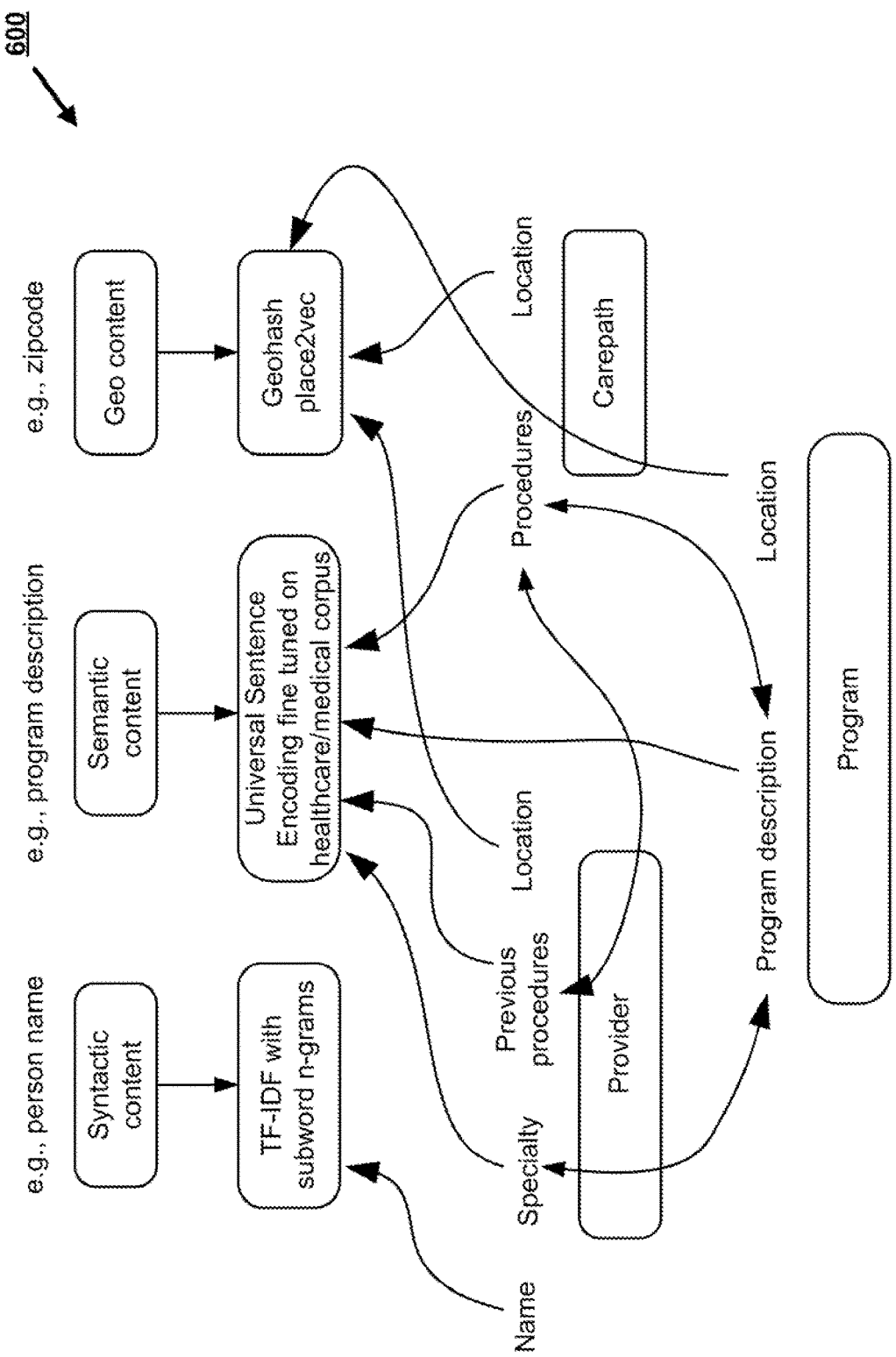

FIG. 6 provides an operational example of a search engine repository item embedding map in accordance with some embodiments discussed herein.

Figure 7:
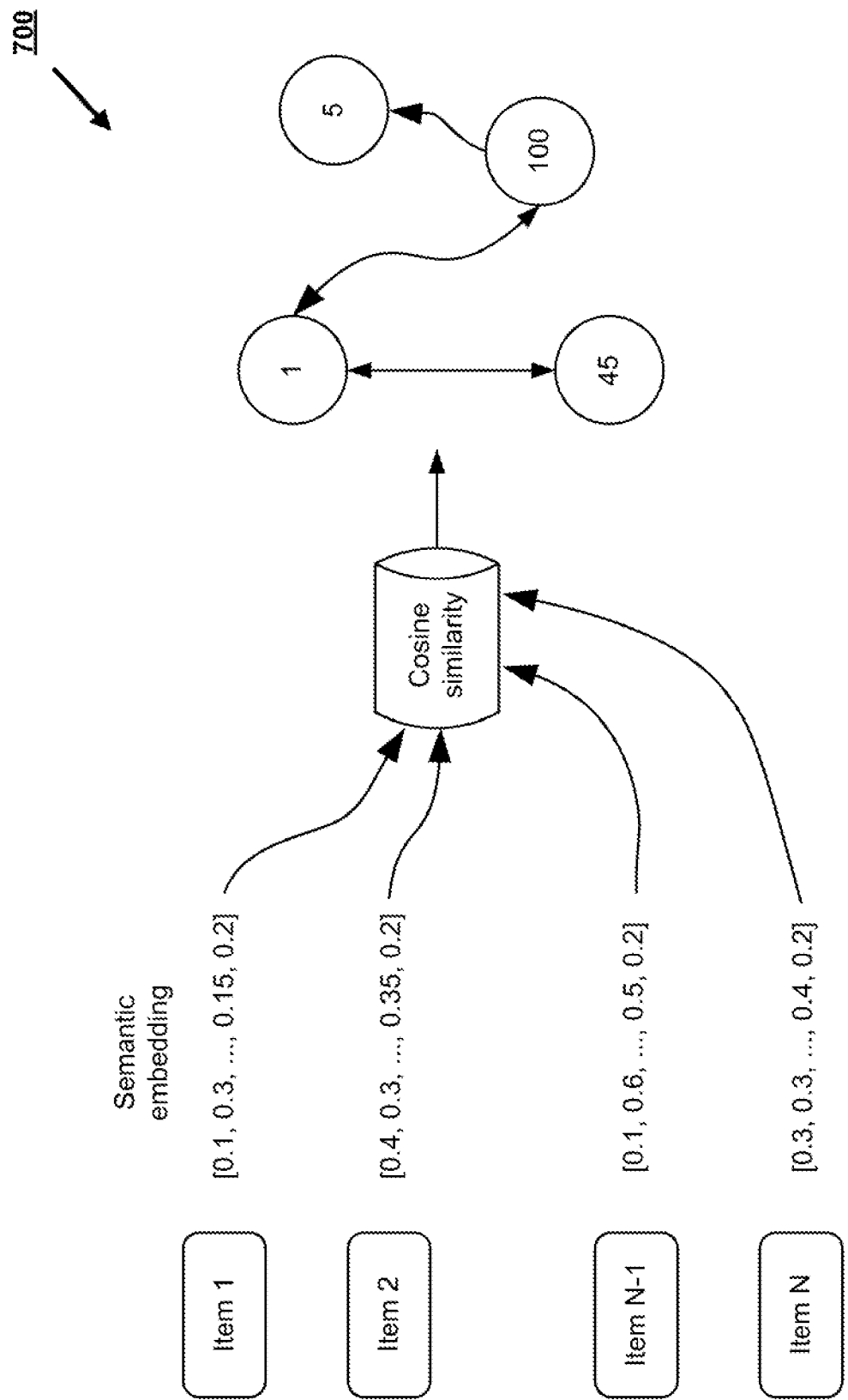

FIG. 7 provides an operation example of a semantic graph framework in accordance with some embodiments discussed herein.

Figure 8:
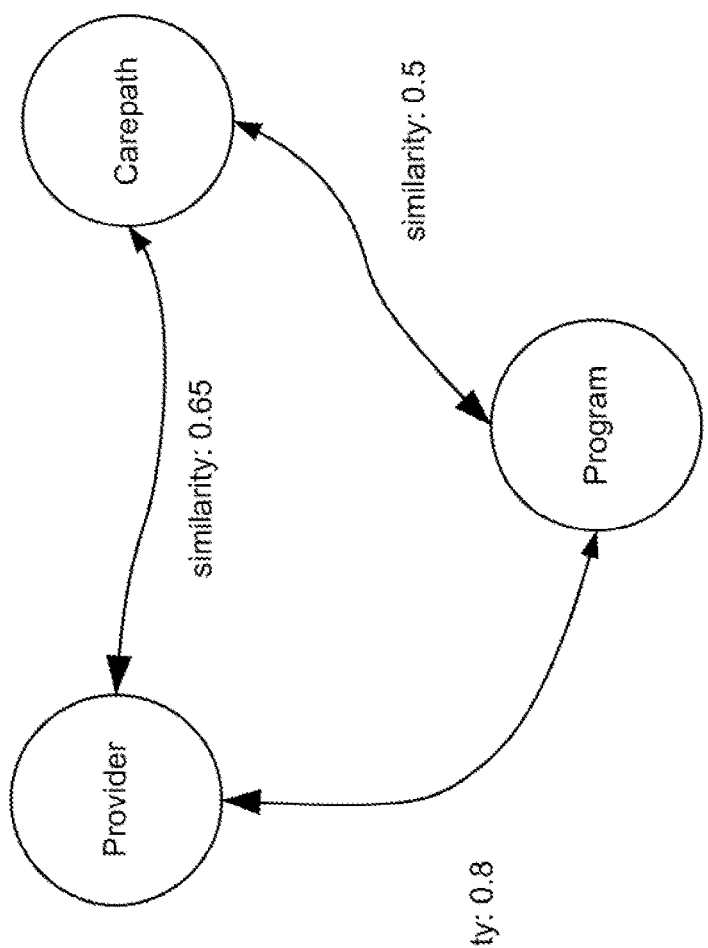

FIG. 8 provides an operation example of a semantic graph in accordance with some embodiments discussed herein.

Figure 9:
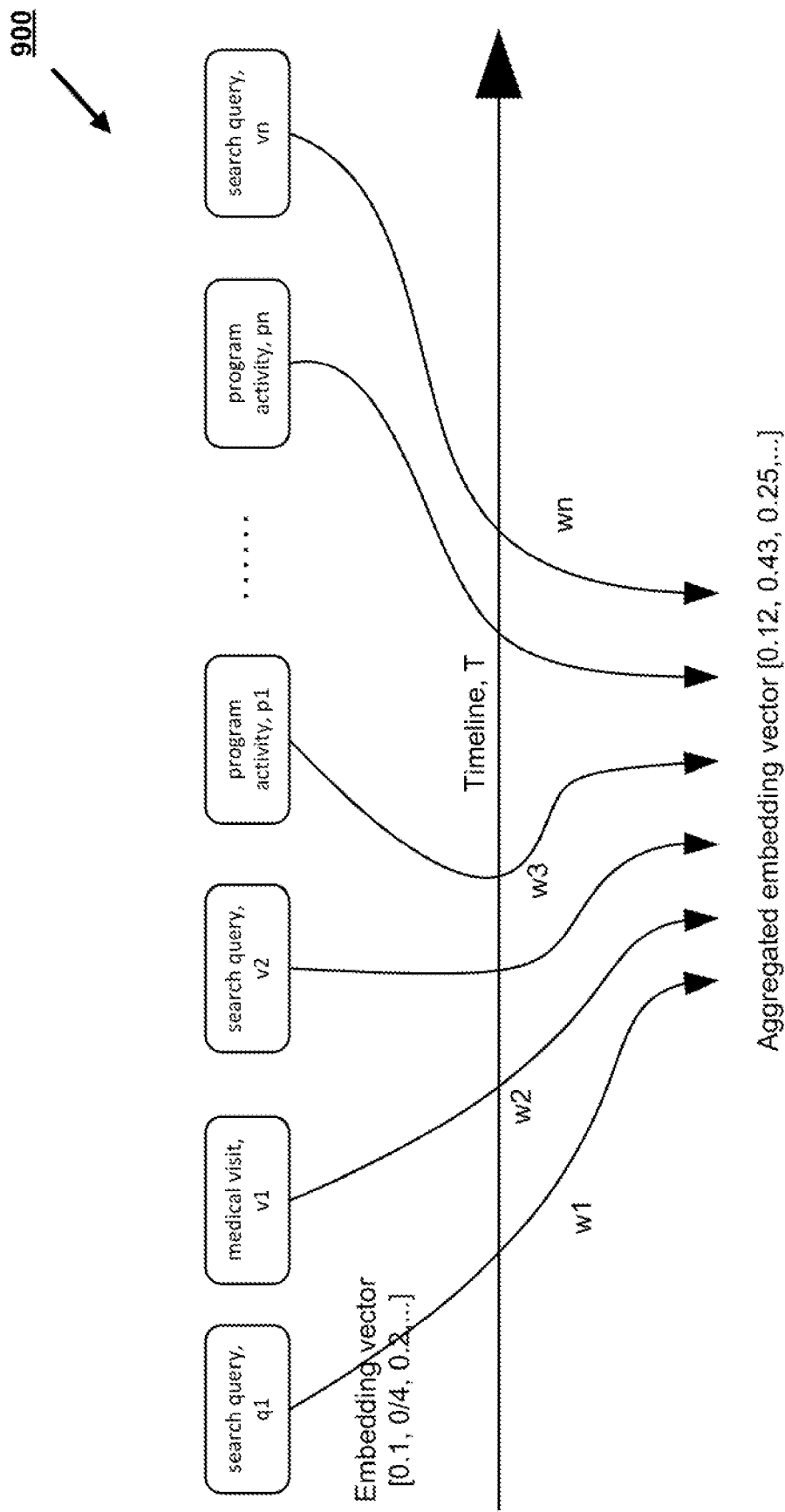

FIG. 9 provides an operational example of a user embedding in accordance with some embodiments discussed herein.

Figure 10:
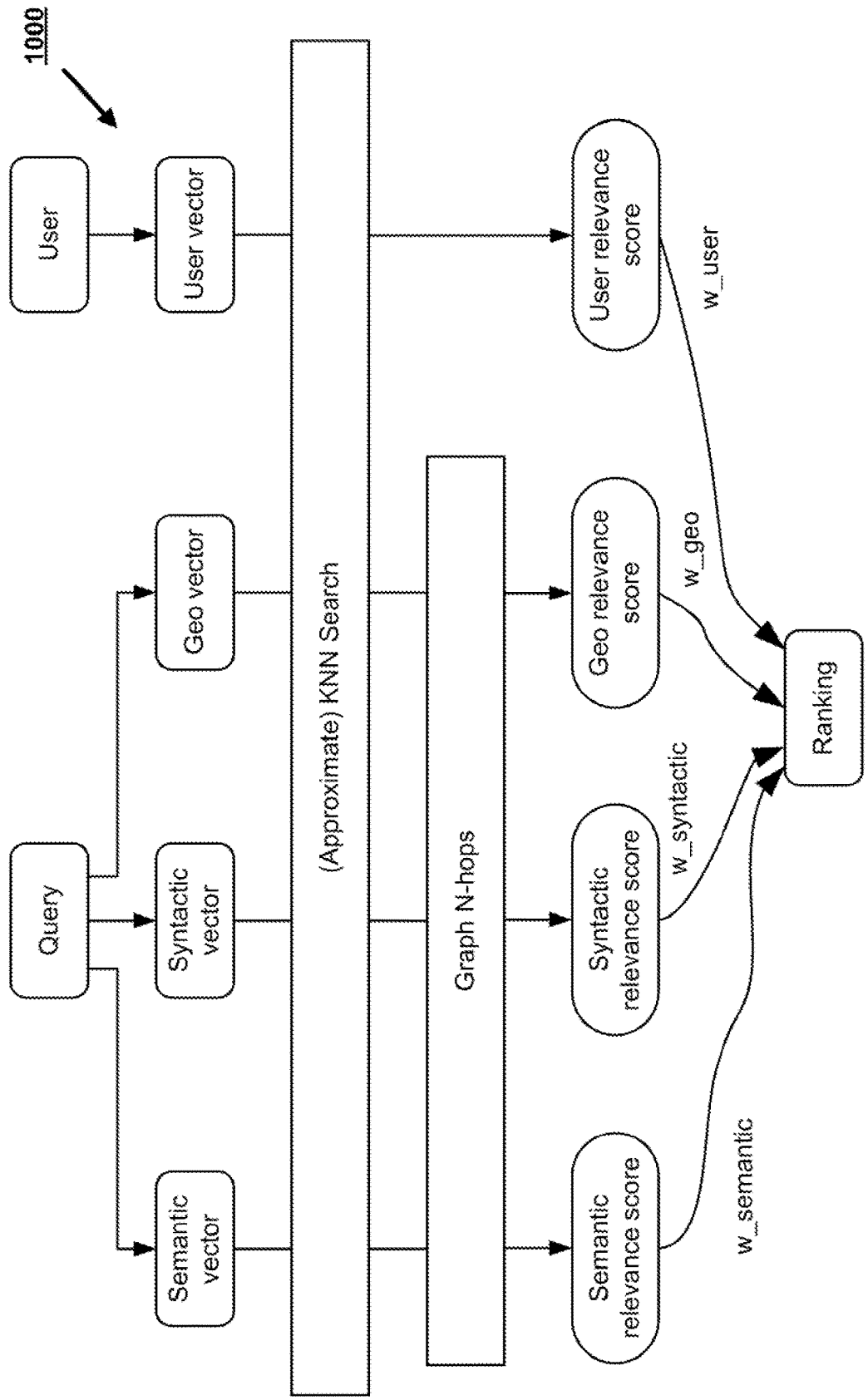

FIG. 10 provides an operational example of a search engine machine learning model in accordance with some embodiments discussed herein.

Figure 11:
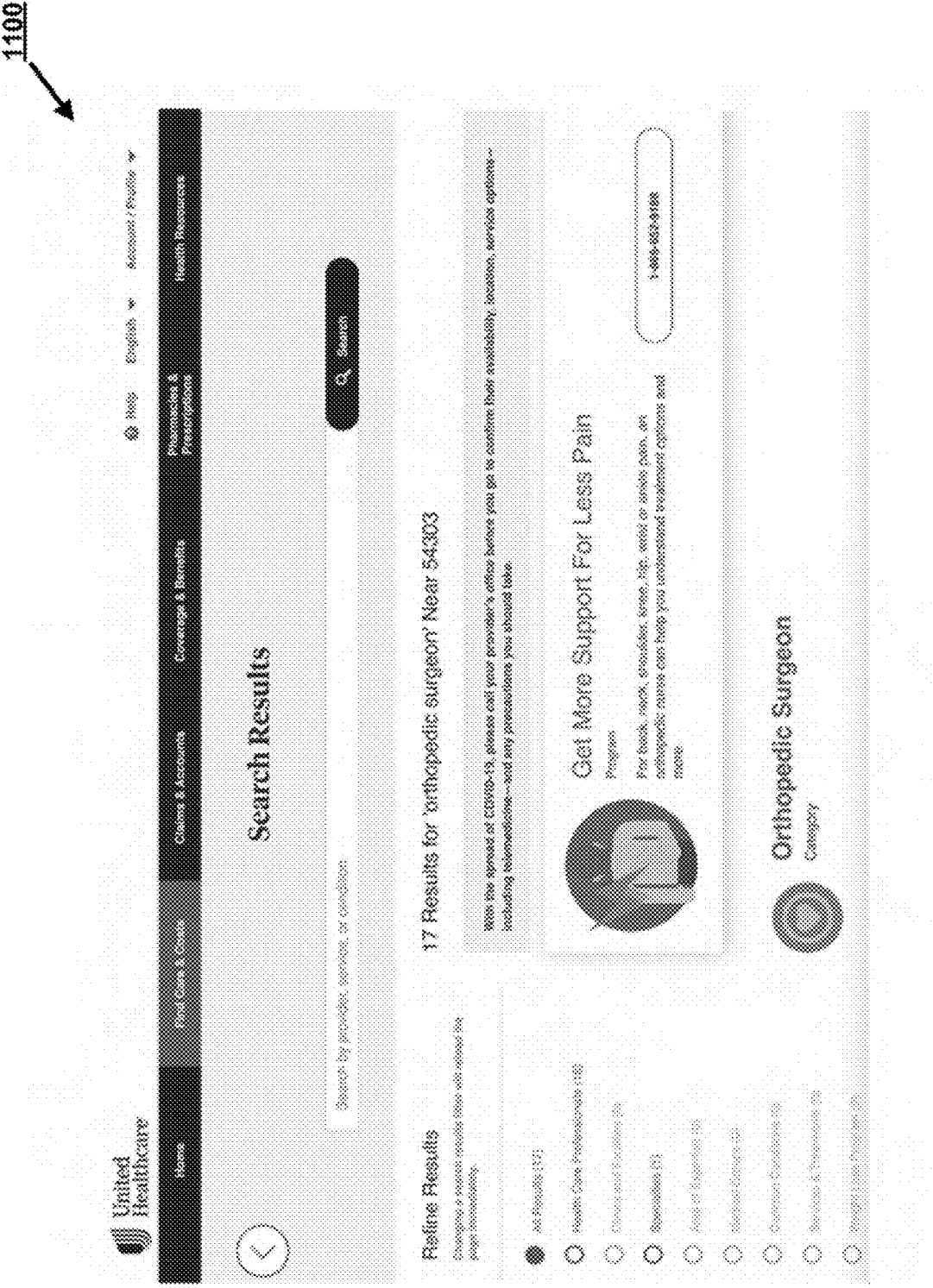

FIG. 11 provides an operation example of a search output user interface in accordance with some embodiments discussed herein.

DETAILED DESCRIPTION

Various embodiments of the present disclosure now will be described more fully hereinafter with reference to the accompanying drawings, in which some, but not all, embodiments of the disclosures are shown. Indeed, these disclosures may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present disclosure are described with reference to predictive data analysis, one of ordinary skill in the art will recognize that the disclosed concepts can be used to perform other types of data analysis.

I. Overview and Technical Improvements

Various embodiments of the present disclosure make important technical contributions to improving predictive accuracy of predictive machine learning models used by information retrieval systems by representing textual items by semantic, syntactic, and spatial embedding, which in turn may improve search speed and efficiency of information retrieval systems. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency-Adaptive Online Training for Fast and Accurate Natural Language Processing* in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improving efficiency and speed of training predictive machine learning models, thus reducing the number of computational operations needed and/or the amount of training data entries needed to train predictive machine learning models. Accordingly, the techniques described herein improve at least one of the computational efficiency, storage-wise efficiency, and speed of training machine learning models.

For example, various embodiments of the present disclosure improve predictive accuracy of predictive machine learning models by representing textual items by semantic, syntactic, and spatial embedding. As described herein, a user of a wellness navigator platform may run search queries on the platform to find resources to help with his/her conditions or problems. For example, one or more programs may be purchased by the user's employer that can help the user be healthier. These programs may be wellness programs, such as stress reduction, general wellness, weight loss, nutrition, tobacco cessation, and clinical programs, such as diabetes management, chronic obstructive pulmonary disease (COPD) management, asthma management, pregnancy management, and orthopedic condition management. In many cases, existing wellness navigator platforms make it difficult for the user to find or facilitate awareness of such programs.

However, in accordance with various embodiments of the present disclosure, an information retrieval system may be configured to retrieve relevant items for user queries by comparing embedding vectors and generating search results based at least in part on semantic, syntactic, geospatial, and user embeddings. This technique will lead to higher accuracy of performing results matching to commonly used keywords as well as uncommon/long-tail/low frequency queries. In doing so, the techniques described herein improve efficiency and speed of training predictive machine learning models, thus reducing the number of computational operations needed and/or the amount of training data entries needed to train predictive machine learning models. Accordingly, the techniques described herein improve at least one of the computational efficiency, storage-wise efficiency, and speed of training predictive machine learning models.

II. Definitions

The term "content category" may refer to a data construct that describes a class or division of textual content, such as a body of text or metadata of search engine repository items from a search engine repository. Examples of content categories may include syntactic content, semantic content, and geospatial content.

The term "content category label" may refer to a data construct that describes a label that associates features, properties, or characteristics to textual content. The content category label may comprise descriptions, tags, or identifiers that classify or emphasize features present in the textual content which may be analyzed by machine learning models to perform a predictive inference. According to some embodiments of the present disclosure, metadata of each search engine repository item within a search engine repository may be extracted and classified with content category labels representative of their content category. The content category labels may be subsequently used to determine a respective embedding to generate for each metadata.

The term "syntactic content" may refer to a data construct that describes textual content that has syntactic meaning. Textual content having syntactic meaning may comprise words that describes a part of speech. An example of syntactic content may include human names. Other textual content may have more than one syntactic meaning. For example, some healthcare brand names may also carry information about the services they provide, such as "CVS" (pharmacy) and "Labcorp" (lab testing).

The term "semantic content" may refer to a data construct that describes textual content that has semantic meaning. Textual content having semantic meaning may comprise words that have certain meanings depending on context. For example, "delivery" may likely refer to "birth" rather than "shipping" in the healthcare and biomedical domain.

The term "geospatial content" may refer to a data construct that describes textual content that is associated with location information. As an example, geospatial content may comprise a street address, zip-code, latitude and longitude, and other geographical coordinates.

The term "search engine repository" may refer to a data construct that describes a collection of data comprising search engine repository items stored and maintained in computer storage for retrieval by an information retrieval system comprising a search engine. As an example, a search engine repository may comprise a data library, archive, knowledge base, or database including data objects that may be accessible to users. In some embodiments of the present disclosure, content associated with search engine repository items, such as text, files, or documents may be retrieved by providing search queries to a search engine.

The term "search engine repository item" may refer to a data construct that describes a data object stored within a search engine repository. Search engine repository items may be retrieved from a search engine repository by an information retrieval system comprising a search engine. As an example, search engine repository items may comprise images, text, audio/video files, and application files that may be retrieved by providing search queries to a search engine. A search engine repository item may further include metadata providing descriptive information of the search engine repository item. For example, a search engine repository item comprising a healthcare provider card item may include provider name, specialty, and location. As another example, a search engine repository item comprising a healthcare program card item may include program headline, program description, and program page content.

The term "search engine repository item embedding" may refer to a data construct that describes a mathematical representation of textual information of search engine repository items for machine learning analysis. According to various embodiments of the present disclosure, metadata of search engine repository items may be parsed and categorized into specific content categories via content category labels. The metadata of the search engine repository items may then be transformed into embedding vectors according to content category. For example, syntactic embeddings, semantic embeddings, and geospatial embeddings may be generated for search engine repository items including metadata comprising (e.g., based at least in part on content category labels) syntactic content, semantic content, and geospatial content.

The term "syntactic embedding" may refer to a data construct that describes a mathematical representation of syntactic content. A syntactic embedding may capture lexical and syntactic features of syntactic content into embedding vectors. According to various embodiments of the present disclosure, syntactic embeddings of syntactic content may be generated by encoding the syntactic content into embedding vectors via a term-frequency inverse document frequency ("TF-IDF") machine learning model. The TF-IDF machine learning model may then be trained on tokenized text of syntactic content. The text of syntactic content may be tokenized with subword n-grams. A subword may comprise a decomposition of a word into a component, such a prefix or suffix. An N-gram may comprise a contiguous sequence of n items from a given sample of text (e.g., n characters of a subword). In some embodiments of the present disclosure, the syntactic embedding may be trimmed by removing bottom tokens with low TF-IDF values.

The term "TF-IDF machine learning model" may refer to parameters, hyperparameters, and/or defined operations of a machine learning model that is configured to encode syntactic content into embedding vectors to create syntactic embeddings. Vectorization of a given syntactic content may comprise calculating a TDF-IDF score for every word in a corpus of syntactic content relative to the given syntactic content and storing the calculated TDF-IDF scores into a TF-IDF vector associated with the given syntactic content. Syntactic embeddings may be used to determine if two syntactic contents are similar by comparing their TF-IDF vectors, e.g., by using cosine similarity.

The term "term-frequency inverse document frequency ("TF-IDF") score" may refer to a calculation comprising a product of a term frequency value with an inverse document frequency value. Term frequency may refer to a frequency of a particular term of a given syntactic content relative to the entirety of the given syntactic content. Inverse document frequency may refer to how common or uncommon a word is amongst a corpus. The TF-IDF score may characterize a word's importance as inversely related to its frequency across a corpus of syntactic content. As such, the higher the TDF-IDF score, the more important or relevant a word may be.

The term "semantic embedding" may refer to a data construct that describes a mathematical representation of semantic content. A semantic embedding may capture the semantic meaning of semantic content. According to various embodiments of the present disclosure, semantic embeddings of semantic content may be generated by employing machine learning models (i.e., semantic content embedding machine learning models) for encoding sentences into embedding vectors, such as Universal Sentence Encoder. In some embodiments, other deep learning models could be used as well instead of the Universal Sentence Encoding model. In certain embodiments, a semantic content embedding machine learning model may be trained and fine-tuned with a given domain-specific corpus to help the semantic content embedding machine learning model understand domain-specific languages. For example, a healthcare/biomedical domain corpus, such as Wikipedia Biomedical, healthcare category articles, UnitedHealth Group web content, or Rally Health article content, may be curated to help the semantic content embedding machine learning model understand healthcare and biomedical domain-specific languages.

The term "semantic content embedding machine learning model" may refer to a data construct that describes parameters, hyperparameters, and/or defined operations of a machine learning model that is configured to encode sentences into embedding vectors to create semantic embeddings. Encoding sentences into embedding vectors may comprise representing entire sentences and their semantic information as vectors, for example, to capture context, intention, and other nuances in the entire text via encoding into the vectors. Semantic content embedding machine learning model may create similar embeddings for similar sentences. Examples of semantic content embedding machine learning models include Doc2Vec, SentenceBERT, InferSent, and Universal Sentence Encoder.

The term "geospatial embedding" may refer to a data construct that describes a mathematical representation of geospatial content. A geospatial embedding may capture the meaning of geospatial content. According to various embodiments of the present disclosure, a geospatial embedding may be generated by, for example, the Place2vec model, or training a skip-gram model similar to Word2vecf (or any other neural network model capable of predicting word associations or creating similar embeddings for words that are similar in context). Geocode-context pairs may be provided to the skip-gram model wherein the geocode is analogous to "center word" and context is analogous to "context word" in the word2vec model. As an example, the context of a geocode-context pair may comprise procedures for medical events from medical claims data (i.e., a geocode-procedure pair). The geocode may be obtained by converting location information of geospatial content into geocode using, for example, a geohashing algorithm. The context may be obtained by associating the geocode to data from a given domain specific corpus.

The term "user embedding" may refer to a data construct that describes a mathematical representation of user profile and history content. In some embodiments of the present disclosure, a search engine may store, for each user, user profile and historical information. For example, a user profile may include demographic and plan information and historical information may include, but not limited to, previous search queries, previous medical visits, previous and current medications, and previous program activities. According to various embodiments of the present disclosure, a user embedding may be generated by encoding each item of user profile and historical information (e.g., search query, medical visit, program activity) of a user into embedding vectors. The embedding vectors may be aggregated into a single embedding vector according to a timeline associated with the user. As such, the aggregated embedding vector may represent the user's interest and activity topics in a defined historical window. A weighting for each of the embeddings in the aggregate embedding vector may be assigned, such as an exponential function, e.g., $e^{-T}$, or a sinusoidal function $\cos(2\pi T)$ which places more weights on more recent events.

The term "query input embedding" may refer to a data construct that describes a mathematical representation of textual information of a query input for machine learning analysis. In some embodiments of the present disclosure, text of a query input may be parsed and categorized into specific content categories. The text may then be transformed into embedding vectors according to each content category. The embedding vectors may encode the meaning and intent of the query input such for comparison with embedding vectors of, for example, search engine repository items from a search engine repository.

The term "search engine machine learning model" may refer to a data construct that describes parameters, hyper-parameters, and/or defined operations of a machine learning model that is configured to generate one or more personalized search results for a query input. According to various embodiments of the present disclosure, the search engine machine learning model may generate the one or more personalized search results by performing a matching of query input embeddings of the query input with search engine repository item embeddings of search engine repository items to retrieve top K candidate search engine repository items along with respective cosine similarity scores. In some embodiments, k-nearest neighbor (KNN) search (e.g., approximate), TF-IDF, or fuzzy logic matching may be performed to identify search engine repository items that are similar to a query input. The query input may be transformed into one or more embedding vectors to match search engine repository item embedding vectors, e.g., syntactic, semantic, and geospatial vectors. In some embodiments, for each of the top K candidate search engine repository items, the search engine machine learning model may perform N hops (e.g., N=1) on a semantic graph to retrieve nearest neighbor search engine repository items to provide related search results, e.g., with respect to top K candidate search engine repository items (which may comprise initial search results). The top K candidate search engine repository items and the nearest neighbor search engine repository items may be ranked based at least in part on cosine similarity scores for each embedding type (e.g., syntactic, semantic, and geospatial) and user relevance score to generate one or more personalized search results. According to another embodiment, the search engine machine learning model may include a predictive engine that implements predictive models to predict users' future event or status to determine search results relevance. As an example, a "maternity program" may be eligible for users who will get pregnant in the next six months. A predictive model may generate a probability of a user getting pregnant in the next six months to determine relevance of the "maternity program" to the user. The predictive models may use the user embedding along with user demographics features to perform predictions. The search engine machine learning model may be trained by generating search engine repository item embeddings. According to some embodiments of the present disclosure, training the search engine machine learning model may comprise assigning one or more content category labels to each search engine repository item of a search engine repository, and for each search engine repository item, a search engine repository item embedding may be generated according to respective content categories associated with the one or more content category labels assigned to the search engine repository item (e.g., syntactic, semantic, geospatial). Training the search engine machine learning model may further comprise generating a semantic graph based at least in part on a similarity measure for pairs of search engine repository item embeddings associated with pairs of the search engine repository items.

The term "k-Nearest-Neighbor (KNN) search" may refer to a search technique for finding K nearest vectors to a query input embedding vector according to a similarity metric, such as Euclidean distance or cosine similarity. According to various embodiments of the present disclosure, a KNN search may be performed between query input embeddings of a query input and search engine repository item embeddings of search engine repository items to retrieve top K candidate search engine repository items along with respective cosine similarity scores. The top K candidate search engine repository items may be included in one or more personalized search results generated for the query input by a search engine machine learning model.

The term "fuzzy logic matching" may refer to an approximate string-matching technique that identifies text or strings that are approximately similar. Fuzzy logic matching may identify correspondences between segments of text (e.g., from query input) and identify search engine repository items including segments that are an approximate match to the segments of text.

The term "initial search results" may refer to a data construct that describes a set of top K candidate search engine repository items retrieved by performing matching of text and/or embeddings of query input with text and/or embeddings of search engine repository items (e.g., metadata). In some embodiments, the top K candidate search engine repository items may also be retrieved by performing matching of a user embedding with search engine repository item embeddings.

The term "related search results" may refer to a data construct that describes a set of nearest neighbor search engine repository items obtained by performing N hops (e.g., N=1) on a semantic graph for each of top K candidate search engine repository items (e.g., initial search results).

The term "personalized search results" may refer to a data construct that describes a prediction-based action comprising at least a portion of initial search results and at least a portion of related search results. Generating the personalized search results may comprise ranking the initial search results and the related search results based at least in part on cosine similarity scores for each embedding type (e.g., syntactic, semantic, and geospatial) and user relevance score to generate one or more personalized search results. The user relevance score may be based at least in part on a user embedding of the user providing the query input. The user relevance score may also be based at least in part on rules according to user features. For example, "maternity program" may be eligible for "female" users. Weights may be assigned to each of the cosine similarity and user relevance scores to calculate a final relevance score used for ranking. The weights may be heuristically determined or learned from the user's feedback (e.g., clickstream) data.

The term "semantic graph" may refer to a data construct that describes a graph including nodes that are representative of search engine repository items from a search engine repository and edges representative of similarity between semantic embeddings of the search engine repository items. According to embodiments of the present disclosure, a semantic graph may be generated by retrieving semantic embeddings of search engine repository items from a search engine repository and computing a measure of similarity between vectors of the semantic embeddings. For items with more than one semantic embedding, an aggregation of the semantic embeddings may be performed, such as averaging or weighted averaging on the embeddings. In some embodiments, the size of a semantic graph may be managed by selecting a threshold value to trim the edges. The threshold value may be determined heuristically or based at least in part on computing resource or performance criteria.

The term "measure of similarity" may refer to a data construct that describes a statistical measure of a strength of a relationship between two variables. In one embodiment, the measure of similarity is representative of similarity between semantic embeddings. Semantic embedding vectors may encode the meaning and intent of, for example, search engine repository items of a search engine repository, for comparison. Once data is converted into embedding vectors, the distance between two embedding vectors may be calculated to determine their similarity or dissimilarity. Generally, embedding vectors that are closer in a vector space may be similar in meaning. As an example, a measure of similarity between two embedding vectors may be computed according to pairwise cosine similarity according to the following equation:

Equation 1

$$\text{cosine similarity} = S_C(A, B) := \cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}},$$

where A and B represent embedding vectors.

III. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for performing predictive data analysis. The architecture 100 includes an information retrieval system 101 configured to receive information retrieval requests from client computing entities 102, process the information retrieval requests to retrieve one or more search results, generate predictions corresponding to the information retrieval requests, and provide the one or more search results to the client computing entities 102 based at least in part on the generated predictions. An example of a prediction that can be performed using the information retrieval system 101 is a prediction of a user's future event or health status.

In accordance with various embodiments of the present disclosure, an information retrieval system may be configured to retrieve relevant items for user queries by comparing embedding vectors and generating search results based at least in part on semantic, syntactic, geospatial, and user embeddings. This technique will lead to higher accuracy of performing results matching to commonly used keywords as well as uncommon/long-tail/low frequency queries. In doing so, the techniques described herein improve efficiency and speed of training predictive machine learning models, thus reducing the number of computational operations needed and/or the amount of training data entries needed to train predictive machine learning models. Accordingly, the techniques described herein improve at least one of the computational efficiency, storage-wise efficiency, and speed of training predictive machine learning models.

In some embodiments, an information retrieval system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The information retrieval system 101 may include an information retrieval computing entity 106 and a storage subsystem 108. The information retrieval computing entity 106 may be configured to receive information retrieval requests from one or more client computing entities 102, process information retrieval requests to retrieve one or more search results, generate predictions corresponding to the information retrieval requests, and provide the one or more search results to the client computing entities 102 based at least in part on the generated predictions.

The storage subsystem 108 may be configured to store data, e.g., search engine repository items, used by the information retrieval computing entity 106 to perform information retrieval as well as generate embeddings used by the information retrieval computing entity 106 to perform various search and predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Exemplary Information Retrieval Computing Entity

FIG. 2 provides a schematic of an information retrieval computing entity 106 according to one embodiment of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the information retrieval computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the information retrieval computing entity 106 may include, or be in communication with, one or more processing elements 205 (also referred to as processors, processing circuitry, and/or similar terms used herein interchangeably) that communicate with other elements within the information retrieval computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the information retrieval computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the information retrieval computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the information retrieval computing entity 106 with the assistance of the processing element 205 and operating system.

As indicated, in one embodiment, the information retrieval computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the information retrieval computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1X (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the information retrieval computing entity 106 may include, or be in communication with, one or more input elements, such as a keyboard input, a mouse input, a touch screen/display input, motion input, movement input, audio input, pointing device input, joystick input, keypad input, and/or the like. The information retrieval computing entity 106 may also include, or be in communication with, one or more output elements (not shown), such as audio output, video output, screen/display output, motion output, movement output, and/or the like.

B. Exemplary Client Computing Entity

FIG. 3 provides an illustrative schematic representative of a client computing entity 102 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the information retrieval computing entity 106. In a particular embodiment, the client computing entity 102 may operate in accordance with multiple wireless communication standards and protocols, such as UMTS, CDMA2000, 1xRTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the information retrieval computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the information retrieval computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FIG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the information retrieval computing entity 106 and/or various other computing entities.

In another embodiment, the client computing entity 102 may include one or more components or functionality that are the same or similar to those of the information retrieval computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As described below, various embodiments of the present disclosure make important technical contributions to improving predictive accuracy of predictive machine learning models used by search engines by representing textual items by semantic, syntactic, and spatial embedding, which in turn may improve search speed and efficiency of information retrieval systems. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency-Adaptive On-line Training for Fast and Accurate Natural Language Processing* in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improving efficiency and speed of training predictive machine learning models, thus reducing the number of computational operations needed and/or the amount of training data entries needed to train predictive machine learning models. Accordingly, the techniques described herein improve at least one of the computational efficiency, storage-wise efficiency, and speed of training machine learning models.

FIG. 4 is a flowchart diagram of an example process 400 for building a search engine. Via the various steps/operations of the process 400, the information retrieval computing entity 106 can use a variety of machine learning frameworks to generate representations of search engine repository items stored in a search engine repository and use the representations to generate one or more search results in response to a query input.

In some embodiments, a search engine repository describes a collection of data comprising search engine repository items stored and maintained in computer storage for retrieval by an information retrieval system comprising a search engine. As an example, a search engine repository may comprise a data library, archive, knowledge base, or database including data objects that may be accessible to users. In some embodiments of the present disclosure, content associated with search engine repository items, such as text, files, or documents may be retrieved by providing search query inputs to a search engine.

The process 400 begins at step/operation 402 when the information retrieval computing entity 106 retrieves one or more search engine repository items. In some embodiments, a search engine repository item describes a data object stored within a search engine repository. Search engine repository items may be retrieved from a search engine repository by an information retrieval system comprising a search engine. As an example, search engine repository items may comprise images, text, audio/video files, and application files that may be retrieved by providing search queries to a search engine.

At step/operation 404, the information retrieval computing entity 106 extracts metadata from the one or more search engine repository items. A search engine repository item may include metadata providing descriptive information of the search engine repository item. For example, a search engine repository item comprising a healthcare provider card item may include provider name, specialty, and location. As another example, a search engine repository item comprising a healthcare program card item may include program headline, program description, and program page content.

At step/operation 406, the information retrieval computing entity 106 assigns one or more content category labels to the metadata. In some embodiments, a content category label describes a label that associates features, properties, or characteristics to textual content. The content category label may comprise descriptions, tags, or identifiers that classify or emphasize features present in the textual content which may be analyzed by machine learning models to perform a predictive inference. According to some embodiments of the present disclosure, metadata of each search engine repository item within a search engine repository may be extracted and classified with content category labels representative of their content category. In some embodiments, a content category describes a class or division of textual content, such as a body of text or metadata of search engine repository items from a search engine repository. Examples of content categories may include syntactic content, semantic content, and geospatial content.

In some embodiments, syntactic content describes textual content that has syntactic meaning. Textual content having syntactic meaning may comprise words that describes a part of speech. An example of syntactic content may include human names. Other textual content may have more than one syntactic meaning. For example, some healthcare brand names may also carry information about the services they provide, such as "CVS" (pharmacy) and "Labcorp" (lab testing).

In some embodiments, semantic content describes textual content that has semantic meaning. Textual content having semantic meaning may comprise words that have certain meanings depending on context. For example, "delivery" may likely refer to "birth" rather than "shipping" in the healthcare and biomedical domain.

In some embodiments, geospatial content describes textual content that is associated with location information. As an example, geospatial content may comprise a street address, zip-code, latitude and longitude, and other geographical coordinates.

The content category labels may be subsequently used to determine a respective embedding to generate for each metadata. At step/operation 408, the information retrieval computing entity 106 generates search engine repository item embeddings based at least in part on the assigned content category labels. In some embodiments, a search engine repository item embedding describes a mathematical representation of textual information of search engine repository items for machine learning analysis. According to various embodiments of the present disclosure, the metadata of the search engine repository items may be transformed into embedding vectors according to content category. For example, syntactic embeddings, semantic embeddings, and geospatial embeddings may be generated for search engine repository items including metadata comprising syntactic content, semantic content, and geospatial content.

In some embodiments, a syntactic embedding describes a mathematical representation of syntactic content. A syntactic embedding may capture lexical and syntactic features of syntactic content into embedding vectors. According to various embodiments of the present disclosure, syntactic embeddings of syntactic content may be generated by encoding the syntactic content into embedding vectors via a term-frequency inverse document frequency ("TF-IDF") machine learning model. The TF-IDF machine learning model may then be trained on tokenized text of syntactic content. The text of syntactic content may be tokenized with subword n-grams. A subword may comprise a decomposition of a word into a component, such a prefix or suffix. An N-gram may comprise a contiguous sequence of n items from a given sample of text (e.g., n characters of a subword). In some embodiments of the present disclosure, the syntactic embedding may be trimmed by removing bottom tokens with low TF-IDF values.

In some embodiments, a TF-IDF machine learning model describes parameters, hyperparameters, and/or defined operations of a machine learning model that is configured to encode syntactic content into embedding vectors to create syntactic embeddings. Vectorization of a given syntactic content may comprise calculating a TDF-IDF score for every word in a corpus of syntactic content relative to the given syntactic content and storing the calculated TDF-IDF scores into a TF-IDF vector associated with the given syntactic content. Syntactic embeddings may be used to determine if two syntactic contents are similar by comparing their TF-IDF vectors, e.g., by using cosine similarity. Calculating a TDF-IDF score may comprise multiplying a term frequency value with an inverse document frequency value. Term frequency may refer to a frequency of a particular term of a given syntactic content relative to the entirety of the given syntactic content. Inverse document frequency may refer to how common or uncommon a word is amongst a corpus. The TF-IDF score may characterize a word's importance as inversely related to its frequency across a corpus of syntactic content. As such, the higher the TDF-IDF score, the more important or relevant a word may be.

In some embodiments, a semantic embedding describes a mathematical representation of semantic content. A semantic embedding may capture the semantic meaning of semantic content. According to various embodiments of the present disclosure, semantic embeddings of semantic content may be generated by employing machine learning models (i.e., semantic content embedding machine learning models) for encoding sentences into embedding vectors, such as Universal Sentence Encoder. In some embodiments, other deep learning models could be used as well instead of the Universal Sentence Encoding model. In certain embodiments, a semantic content embedding machine learning model may be trained and fine-tuned with a given domain-specific corpus to help the semantic content embedding machine learning model understand domain-specific languages. For example, a healthcare/biomedical domain corpus, such as Wikipedia Biomedical, healthcare category articles, UnitedHealth Group web content, or Rally Health article content, may be curated to help the semantic content embedding machine learning model understand healthcare and biomedical domain-specific languages.

In some embodiments, a semantic content embedding machine learning model describes parameters, hyperparameters, and/or defined operations of a machine learning model that is configured to encode sentences into embedding vectors to create semantic embeddings. Encoding sentences into embedding vectors may comprise representing entire sentences and their semantic information as vectors, for example, to capture context, intention, and other nuances in the entire text via encoding into the vectors. Semantic content embedding machine learning model may create similar embeddings for similar sentences. Examples of semantic content embedding machine learning models include Doc2Vec, SentenceBERT, InferSent, and Universal Sentence Encoder.

In some embodiments, a geospatial embedding describes a mathematical representation of geospatial content. A geospatial embedding may capture the meaning of geospatial content. According to various embodiments of the present disclosure, a geospatial embedding may be generated by, for example, the Place2vec model, or training a skip-gram model similar to Word2vecf (or any other neural network model capable of predicting word associations or creating similar embeddings for words that are similar in context). Geocode-context pairs may be provided to the skip-gram model wherein the geocode is analogous to "center word" and context is analogous to "context word" in the word2vec model. As an example, the context of a geocode-context pair may comprise procedures for medical events from medical claims data (i.e., a geocode-procedure pair). The geocode may be obtained by converting location information of geospatial content into geocode using a geohashing algorithm. The context may be obtained by associating the geocode to data from a given domain specific corpus.

An operational example of a search engine repository item embedding map 600 comprising syntactic embeddings, semantic embeddings, and geospatial embeddings is depicted in FIG. 6. As depicted in FIG. 6, in some embodiments, a search engine repository may include various types of search engine repository items, such as a "Provider," "Program," and "Carepath" cards. Each type of search engine repository item may include metadata associated with one or more content categories which may be assigned content category labels. Moreover, as further depicted in FIG. 6, in some embodiments, metadata of the search engine repository items are used to generate search engine repository item embeddings based at least in part on content category labels of the metadata.

However, as described herein, in accordance with various embodiments of the present disclosure, an information retrieval system may be configured to retrieve relevant items for user queries by comparing embedding vectors and generating search results based at least in part on semantic, syntactic, geospatial, and user embeddings. This technique will lead to higher accuracy of performing results matching to commonly used keywords as well as uncommon/long-tail/low frequency queries. In doing so, the techniques described herein improve efficiency and speed of training predictive machine learning models, thus reducing the number of computational operations needed and/or the amount of training data entries needed to train predictive machine learning models. Accordingly, the techniques described herein improve at least one of the computational efficiency, storage-wise efficiency, and speed of training predictive machine learning models.

Returning to FIG. 4, at step/operation 410, the information retrieval computing entity 106 generates a semantic graph based at least in part on a measure of similarity of the search engine repository item embeddings. In some embodiments, a semantic graph describes a graph including nodes that are representative of search engine repository items from a search engine repository and edges representative of similarity between semantic embeddings of the search engine repository items. According to embodiments of the present disclosure, generating a semantic graph comprises retrieving semantic embeddings of search engine repository items from a search engine repository and computing a measure of similarity between vectors of the semantic embeddings. In some embodiments, the semantic graph is created via a framework 700 that is depicted in FIG. 7. As depicted in FIG. 7, a semantic graph comprises nodes representative of the search engine repository items coupled with edges based at least in part on the measure of similarity of the semantic embeddings corresponding to the nodes.

An operational example of a semantic graph 800 is depicted in FIG. 8. As further depicted in FIG. 8, semantic embeddings of metadata associated with search engine repository items are represented by nodes that are coupled to each other with edges including similarity scores based at least in part on a calculated measure of similarity.

In some embodiments, a measure of similarity describes a statistical measure of a strength of a relationship between two variables. In one embodiment, the measure of similarity is representative of similarity between semantic embeddings. Semantic embedding vectors may encode the meaning and intent of, for example, search engine repository items of a search engine repository, for comparison. Once data is converted into embedding vectors, the distance between two embedding vectors may be calculated to determine their similarity or dissimilarity. Generally, embedding vectors that are closer in a vector space may be similar in meaning. As an example, a measure of similarity between two embedding vectors may be computed according to pairwise cosine similarity which may be calculated using Equation 1.

For items with more than one semantic embedding, an aggregation of the semantic embeddings may be performed, such as averaging or weighted averaging on the embeddings. In some embodiments, the size of a semantic graph may be managed by selecting a threshold value to trim the edges. The threshold value may be determined heuristically or based at least in part on criteria.

FIG. 5 is a flowchart diagram of an example process 500 for performing search operations on query inputs. Via the various steps/operations of the process 500, the information retrieval computing entity 106 can use a search engine machine learning model configured to generate one or more personalized search results for a query input. The process 500 begins at step/operation 502 when the information retrieval computing entity 106 receives a query input. The query input may comprise a text input including one or more phrases or keywords that are transmitted to computing entity 106 from one of client computing entities 102.

At step/operation 504, the information retrieval computing entity 106 generates one or more query input embeddings of the query input. The query input may be transformed into one or more embedding vectors to match search engine repository item embedding vectors. According to various embodiments of the present disclosure, the query input may be parsed and processed according to one or more content categories. That is, certain types of information corresponding to one or more content categories may be extracted from the query input. For example, names (corresponding to syntactic content), descriptions (corresponding to semantic content), and location information (corresponding to geospatial content) may be identified from the query input.

The content categories may be selected based at least in part on existing content categories to match embeddings of search engine repository items. For example, the information retrieval computing entity 106 may generate one or more query input embeddings comprising syntactic, semantic, and geospatial vectors to match syntactic, semantic, and geospatial embedding vectors of search engine repository items. In some embodiments, various preprocessing may be performed to standardize the query input. As an example, a portion of query input associated with syntactic content may be scrubbed of titles (e.g., Dr., Mr. Ms.) and prefix/suffix (e.g., M.D., Jr., Sr.). Other embodiments may include spelling correction and full-term conversion of acronyms.

At step/operation 506, the information retrieval computing entity 106 generates initial search results. In some embodiments, initial search results describe a set of top K candidate search engine repository items retrieved by performing matching of text and/or embeddings of a query input with respect to text and/or embeddings of search engine repository items (e.g., metadata). According to one embodiment, initial search results may be generated by matching text and/or embeddings of a query input with metadata and/or embeddings of the metadata associated with search engine repository items via KNN search, TF-IDF, fuzzy logic matching, or any combination thereof, to identify search engine repository items that are relevant or similar to the query input. In particular, the matching may be performed respectively for each content type. For example, syntactic matching using the aforementioned matching techniques may be performed on syntactic content, such as names, of a query input and syntactic content of metadata of search engine repository items. Similarly, semantic matching using the aforementioned matching techniques may be performed on semantic content of query input and semantic content of metadata of search engine repository items. Furthermore, geospatial matching using the aforementioned matching techniques may be performed on geospatial content of query input and geospatial content of metadata of search engine repository items.

In some embodiments, KNN search describes a search technique for finding K nearest vectors to a query input embedding vector according to a similarity metric, such as Euclidean distance or cosine similarity. According to various embodiments of the present disclosure, a KNN search may be performed between query input embeddings of a query input and search engine repository item embeddings of search engine repository items to retrieve top K candidate search engine repository items along with respective cosine similarity scores. The top K candidate search engine repository items may be included in one or more personalized search results generated for the query input.

In some embodiments, fuzzy logic matching describes an approximate string-matching technique that identifies text or strings that are approximately similar. Fuzzy logic matching may identify correspondences between segments of text (e.g., from query input) and identify search engine repository items including segments that are an approximate match to the segments of text.

According to various embodiments of the present disclosure, the top K candidate search engine repository items may also be retrieved by performing matching of a user embedding with search engine repository item embeddings, similar to matching of user input embeddings. For example, the user embedding may be matched to embeddings of the metadata associated with search engine repository items via KNN search, TF-IDF, fuzzy logic matching, or any combination thereof.

In some embodiments, a user embedding describes a mathematical representation of user profile and history content. In some embodiments of the present disclosure, a search engine may store, for each user, user profile and historical information. For example, a user profile may include demographic and plan information and historical information may include, but not limited to, previous search queries, previous medical visits, previous and current medications, and previous program activities. According to various embodiments of the present disclosure, a user embedding may be generated by encoding each item of user profile and historical information (e.g., search query, medical visit, program activity) of a user into embedding vectors.

An operational example of a user embedding 900 is depicted in FIG. 9. As further depicted in FIG. 9, a plurality of embedding vectors corresponding to an aggregate of user profile and history content may be aggregated into a single embedding vector according to a timeline associated with the user. As such, the aggregated embedding vector may represent the user's interest and activity topics in a defined historical window. A weighting for each of the embeddings in the aggregate embedding vector may be assigned, such as an exponential function, e.g., $e^{-T}$, or a sinusoidal function $\cos(2\pi T)$ which places more weights on more recent events.

Generating the initial search results may further comprise retrieving similarity scores (e.g., cosine similarity) of the top K candidate search engine repository items based at least in part on the matching. The similarity score may be used for ranking the relevance of the initial search results.

Returning to FIG. 4, at step/operation 508, the information retrieval computing entity 106 generates related search results associated with the initial search results. In some embodiments, for each of the top K candidate search engine repository items, nearest neighbor search engine repository items may be retrieved by performing N hops (e.g., N=1) on a semantic graph to provide related search results, e.g., with respect to top K candidate search engine repository items (i.e., the initial search results).

At step/operation 510, the information retrieval computing entity 106 generates one or more personalized search results for the query input. In some embodiments, personalized search results describe a prediction-based action comprising at least a portion of initial search results and at least a portion of related search results. According to various embodiments of the present disclosure, generating the personalized search results may comprise ranking the initial search results and the related search results based at least in part on cosine similarity scores for each embedding type (e.g., syntactic, semantic, and geospatial) and user relevance score to generate one or more personalized search results. The user relevance score may be based at least in part on a user embedding of the user providing the query input. The user relevance score may also be based at least in part on rules according to user features. For example, "maternity program" may be eligible for "female" users.

Generating the one or more personalized search results may comprise a prediction-based action. According to another embodiment, the search engine machine learning model may include a predictive engine that implements predictive models to predict users' future event or status to determine search results relevance. As an example, a "maternity program" may be eligible for users who will get pregnant in the next six months. A predictive model may generate a probability of a user getting pregnant in the next six months to determine relevance of the "maternity program" to the user. The predictive models may use the user embedding along with user demographics features to perform predictions. Weights may be assigned to each of the cosine similarity and user relevance scores to calculate a final relevance score used for ranking. The final relevance score may be calculated according to the following equation:

$$\text{final relevance} = w_{semantic} * \text{relevance}_{semantic} + w_{syntactic} * \text{relevance}_{syntactic} + w_{geo} * \text{relevance}_{geo} + w_{user} * \text{relevance}_{user}$$

Equation 2

In the above equation, the weights may be heuristically determined or learned from the user's feedback (e.g., clickstream) data.

FIG. 10 depicts an operational example of a search engine machine learning model. As depicted in FIG. 10, search results are ranked according to weighted relevance scores based at least in part on semantic, syntactic, geospatial, and user relevance of search engine repository items with respect to query input embeddings and user embeddings.

In some embodiments, generating the one or more personalized search results for the query input includes displaying the one or more personalized search results using a search output user interface, such as the search output user interface 1100 of FIG. 11. As depicted in FIG. 11, the search output user interface 1100 displays a list of top search results for a query input.

Accordingly, as described above, various embodiments of the present disclosure make important technical contributions to improving predictive accuracy of predictive machine learning models used by search engines by representing textual items by semantic, syntactic, and spatial embedding, which in turn may improve search speed and efficiency of information retrieval systems. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency-Adaptive On-line Training for Fast and Accurate Natural Language Processing* in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improving efficiency and speed of training predictive machine learning models, thus reducing the number of computational operations needed and/or the amount of training data entries needed to train predictive machine learning models. Accordingly, the techniques described herein improve at least one of the computational efficiency, storage-wise efficiency, and speed of training machine learning models.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
   receiving, by one or more processors, a query input; and
   generating, by the one or more processors and using a search engine machine learning model, a prediction-based action for the query input by:
   (i) generating a plurality of query input embeddings of the query input that respectively correspond to a plurality of content categories. wherein the plurality of content categories comprises a geospatial content category and the plurality of query input embeddings comprises a query geohash embedding corresponding to the query input,
   (ii) identifying a plurality of initial search result sets, using a k-Nearest-Neighbor (KNN) search, respectively corresponding to the plurality of content categories based at least in part on a comparison between the plurality of query input embeddings and a plurality of search engine repository item embeddings,
   (iii) generating, via N hops within a semantic graph starting from a plurality of nodes respectively associated with the plurality of initial search result sets, a plurality of related search results, and
   (iv) generating the prediction-based action for the query input based at least in part on the plurality of related search results.

2. The computer-implemented method of claim 1, wherein a search engine repository item of a plurality of search engine repository items respectively corresponding to the plurality of search engine repository item embeddings comprises metadata corresponding to a content category label, and a search engine repository item embedding is generated for the search engine repository item using an embedding technique corresponding to the content category label.

3. The computer-implemented method of claim 2, wherein the embedding technique comprises generating a syntactic embedding by:
   generating tokenized content by tokenizing content of the search engine repository item with subword n-grams;
   training a term-frequency inverse document frequency (TF-IDF) model on the tokenized content; and
   removing one or more bottom tokens with low TF-IDF values from the tokenized content.

4. The computer-implemented method of claim 2, wherein the embedding technique comprises generating a semantic embedding by:
   retrieving a domain corpus; and
   tuning a universal sentence encoding model on the domain corpus.

5. The computer-implemented method of claim 2, wherein the embedding technique comprises generating a geohash embedding by:
   converting geospatial information into one or more geocodes according to a geohashing algorithm;
   identifying, from a data source, procedure geocode pairs based at least in part on procedures associated with respective ones of the one or more geocodes; and
   training a skip-gram model based at least in part on the procedure geocode pairs.

6. The computer-implemented method of claim 1, wherein the plurality of content categories comprises one or more of: a syntactic content category, a semantic content category, and the geospatial content category.

7. The computer-implemented method of claim 1, further comprising:
   generating the semantic graph based at least in part on a measure of similarity for pairs of the plurality of search engine repository item embeddings respectively corresponding to a plurality of search engine repository items, wherein generating the semantic graph comprises:
   retrieving a plurality of semantic embeddings respectively corresponding to the plurality of search engine repository items;
   computing the measure of similarity between pairs of the plurality of semantic embeddings;

generating edges between the pairs of the plurality of search engine repository item embeddings in the semantic graph based at least in part on the measure of similarity; and removing given ones of the edges according to a threshold value.

8. The computer-implemented method of claim 7, wherein the measure of similarity comprises pairwise cosine similarity.

9. The computer-implemented method of claim 1, wherein the plurality of query input embeddings further comprises a user embedding that is based at least in part on historical information and activities data associated with a user that provides the query input.

10. The computer-implemented method of claim 1, further comprising: ranking one or more search results of the plurality of initial search result sets and the plurality of related search results based on a user relevance score.

11. The computer-implemented method of claim 10, wherein the user relevance score is computed based at least in part on semantic relevance, syntactic relevance, geospatial relevance, and user relevance.

12. A system comprising one or more processors and at least one memory storing processor-executable instructions that, when executed by the one or more processors, configure the system to perform operations comprising:
receiving a query input; and
generating, using a search engine machine learning model, a prediction-based action for the query input by:
(i) generating a plurality of query input embeddings of the query input that respectively correspond to a plurality of content categories, wherein the plurality of content categories comprises a geospatial content category and the plurality of query input embeddings comprises a query geohash embedding corresponding to the query input,
(ii) identifying a plurality of initial search result sets, using a k-Nearest-Neighbor (KNN) search, respectively corresponding to the plurality of content categories based at least in part on a comparison between the plurality of query input embeddings and a plurality of search engine repository item embeddings,
(iii) generating, via N hops within a semantic graph starting from a plurality of nodes respectively associated with the plurality of initial search result sets, a plurality of related search results, and
(iv) generating the prediction-based action for the query input based at least in part on the plurality of related search results.

13. The system of claim 12, wherein a search engine repository item of a plurality of search engine repository items respectively corresponding to the plurality of search engine repository item embeddings comprises metadata corresponding to a content category label, and a search engine repository item embedding is generated for the search engine repository item using an embedding technique corresponding to the content category label.

14. The system of claim 13, wherein the embedding technique comprises generating a syntactic embedding by:
generating tokenized content by tokenizing content of the search engine repository item with subword n-grams;
training a term-frequency inverse document frequency (TF-IDF) model on the tokenized content; and
removing one or more bottom tokens with low TF-IDF values from the tokenized content.

15. The system of claim 13, wherein the embedding technique comprises generating a semantic embedding by:
retrieving a domain corpus; and
tuning a universal sentence encoding model on the domain corpus.

16. The system of claim 13, wherein the embedding technique comprises generating a geohash embedding by:
converting geospatial information into one or more geocodes according to a geohashing algorithm;
identifying, from a data source, procedure geocode pairs based at least in part on procedures associated with respective ones of the one or more geocodes; and
training a skip-gram model based at least in part on the procedure geocode pairs.

17. The system of claim 12, wherein the plurality of content categories comprises at least one of: a syntactic content category, a semantic content category, and the geospatial content category.

18. The system of claim 12, wherein the operations further comprise:
generating the semantic graph based at least in part on a measure of similarity for pairs of the plurality of search engine repository item embeddings respectively corresponding to a plurality of search engine repository items by:
retrieving a plurality of semantic embeddings respectively corresponding to the plurality of search engine repository items;
computing the measure of similarity between pairs of the plurality of semantic embeddings;
generating edges between the pairs of the plurality of search engine repository item embeddings in the semantic graph based at least in part on the measure of similarity; and
removing given ones of the edges according to a threshold value.

19. The system of claim 12, wherein the plurality of query input embeddings further comprises a user embedding that is based at least in part on historical information and activities data associated with a user that provides the query input.

20. One or more non-transitory computer-readable storage media comprising instructions that, when executed by one or more processors, cause the one or more processors to perform operations comprising:
receiving a query input; and
generating, using a search engine machine learning model, a prediction-based action for the query input by:
(i) generating a plurality of query input embeddings of the query input that respectively correspond to a plurality of content categories, wherein the plurality of content categories comprises a geospatial content category and the plurality of query input embeddings comprises a query geohash embedding corresponding to the query input;
(ii) identifying a plurality of initial search result sets, using a k-Nearest-Neighbor (KNN) search, respectively corresponding to the plurality of content categories based at least in part on a comparison between the plurality of query input embeddings and a plurality of search engine repository item embeddings,
(iii) generating, via N hops within a semantic graph starting from a plurality of nodes respectively associated with the plurality of initial search result sets, a plurality of related search results, and (iv) generating the prediction-based action for the query input based at least in part on the plurality of related search results.

\* \* \* \* \*

UNITED STATES PATENT AND TRADEMARK OFFICE
CERTIFICATE OF CORRECTION

PATENT NO. : 12,169,512 B2  
APPLICATION NO. : 17/971491  
DATED : December 17, 2024  
INVENTOR(S) : Laura D. Hamilton et al.

It is certified that error appears in the above-identified patent and that said Letters Patent is hereby corrected as shown below:

In the Claims

In Column 25, Line 66, Claim 1, delete "categories." and insert -- categories, --, therefor.

In Column 26, Line 54, Claim 6, delete "category, and" and insert -- category, or --, therefor.

In Column 28, Line 16, Claim 17, delete "at least one" and insert -- one or more --, therefor.

In Column 28, Line 17, Claim 17, delete "category, and" and insert -- category, or --, therefor.

In Column 28, Line 57, Claim 20, delete "input;" and insert -- input, --, therefor.

Signed and Sealed this  
Twenty-second Day of April, 2025

Coke Morgan Stewart  
*Acting Director of the United States Patent and Trademark Office*